US008270049B2

(12) United States Patent
McElvain

(10) Patent No.: US 8,270,049 B2
(45) Date of Patent: Sep. 18, 2012

(54) SYSTEM AND METHOD FOR HIGH RESOLUTION CHARACTERIZATION OF SPATIAL VARIANCE OF COLOR SEPARATION MISREGISTRATION

(75) Inventor: Jon McElvain, Manhattan Beach, CA (US)

(73) Assignee: Xerox Corporation, Norwalk, CT (US)

( * ) Notice: Subject to any disclaimer, the term of this patent is extended or adjusted under 35 U.S.C. 154(b) by 1021 days.

(21) Appl. No.: 11/496,907

(22) Filed: Aug. 1, 2006

(65) Prior Publication Data
US 2008/0030787 A1     Feb. 7, 2008

(51) Int. Cl.
H04N 1/46        (2006.01)

(52) U.S. Cl. ......... 358/515; 358/1.9; 358/2.1; 358/3.26; 358/504; 382/162; 382/167

(58) Field of Classification Search .................. None
See application file for complete search history.

(56) References Cited

U.S. PATENT DOCUMENTS

| | | |
|---|---|---|
| 4,391,505 A | 7/1983 | Silverberg |
| 4,546,700 A | 10/1985 | Kishner et al. |
| 4,788,116 A | 11/1988 | Hochberg |
| 4,814,891 A | 3/1989 | Uchiyama et al. |
| 4,831,420 A | 5/1989 | Walsh et al. |
| 4,937,664 A | 6/1990 | Chiku et al. |
| 4,959,712 A | 9/1990 | Tsuzuki et al. |
| 5,081,507 A | 1/1992 | Monkelbaan et al. |
| 5,184,011 A | 2/1993 | Hubble, III et al. |
| 5,227,815 A | 7/1993 | Dastin et al. |
| 5,260,725 A | 11/1993 | Hammond |
| 5,272,493 A | 12/1993 | Hubble, III et al. |
| 5,278,625 A | 1/1994 | Charnitski et al. |
| 5,287,162 A | 2/1994 | de Jong et al. |
| 5,329,466 A | 7/1994 | Monney |
| 5,339,150 A | 8/1994 | Hubble, III et al. |
| 5,339,159 A | 8/1994 | Nakamura et al. |
| 5,342,715 A | 8/1994 | Kamath et al. |
| 5,384,592 A | 1/1995 | Wong |
| 5,406,066 A | 4/1995 | Steinle et al. |
| 5,418,556 A | 5/1995 | Andrews |
| 5,457,518 A | 10/1995 | Ashikaga et al. |
| 5,523,823 A | 6/1996 | Ashikaga |
| 5,526,140 A | 6/1996 | Rozzi |

(Continued)

OTHER PUBLICATIONS

Hains, "The Influence of Halftone Orientation on Color Gamut", Recent Progress in Digital Halftoning, IS&T Pub. (1995).

(Continued)

*Primary Examiner* — King Poon
*Assistant Examiner* — Dung Tran
(74) *Attorney, Agent, or Firm* — Gibb & Riley, LLC

(57) ABSTRACT

A method is provided for characterizing color separation misregistration of a printer device using color separations of a color space for marking substrate. The method includes providing an input image including a pattern of patches including at least one measurement patch, each measurement patch having at least a first and second color separation of the color space, and marking a substrate in accordance with the input image for generating an output image having a marked pattern of patches which corresponds to the pattern of patches. Spectral reflectance of at least one respective patch of the marked patch pattern of the output image is measured and respective spectral reflectance values corresponding to the measuring are generated. Misregistration is characterized between the at least first and second color separations of each measurement patch of the at least one measurement patch based on the spectral reflectance values.

17 Claims, 8 Drawing Sheets

U.S. PATENT DOCUMENTS

| | | | |
|---|---|---|---|
| 5,537,190 A | 7/1996 | Folkins et al. | |
| 5,572,601 A | 11/1996 | Bloomberg | |
| 5,574,527 A | 11/1996 | Folkins | |
| 5,600,404 A | 2/1997 | Ando et al. | |
| 5,631,686 A | 5/1997 | Castelli et al. | |
| 5,636,330 A | 6/1997 | Barak | |
| 5,689,425 A | 11/1997 | Sainio et al. | |
| 5,760,815 A | 6/1998 | Genovese | |
| 5,768,671 A | 6/1998 | Komiya et al. | |
| 5,774,156 A | 6/1998 | Guerin | |
| 5,778,280 A | 7/1998 | Komiya et al. | |
| 5,793,901 A | 8/1998 | Matsutake et al. | |
| 5,808,658 A | 9/1998 | Hoover | |
| 5,825,984 A | 10/1998 | Mori et al. | |
| 5,887,996 A | 3/1999 | Castelli et al. | |
| 5,909,235 A * | 6/1999 | Folkins | 347/240 |
| 5,973,718 A | 10/1999 | Charnitski et al. | |
| 5,978,615 A | 11/1999 | Tanaka et al. | |
| 5,995,802 A | 11/1999 | Mori et al. | |
| 6,014,154 A | 1/2000 | Guerin | |
| 6,035,076 A | 3/2000 | Nagase | |
| 6,129,015 A | 10/2000 | Dewey | |
| 6,133,932 A | 10/2000 | Webb et al. | |
| 6,148,168 A | 11/2000 | Hirai et al. | |
| 6,154,628 A | 11/2000 | Kawano | |
| 6,164,847 A | 12/2000 | Allen | |
| 6,185,402 B1 | 2/2001 | Linssen | |
| 6,198,490 B1 | 3/2001 | Eom et al. | |
| 6,198,549 B1 | 3/2001 | Decker et al. | |
| 6,198,550 B1 | 3/2001 | Toyoda | |
| 6,215,512 B1 | 4/2001 | Imaizumi et al. | |
| 6,236,470 B1 | 5/2001 | Seachman | |
| 6,239,828 B1 | 5/2001 | Ito et al. | |
| 6,246,857 B1 | 6/2001 | Tanaka | |
| 6,253,678 B1 | 7/2001 | Wentworth | |
| 6,275,244 B1 | 8/2001 | Omelchenko et al. | |
| 6,288,556 B1 | 9/2001 | Sato et al. | |
| 6,292,208 B1 | 9/2001 | Lofhus et al. | |
| 6,295,435 B1 | 9/2001 | Shinohara et al. | |
| 6,300,968 B1 | 10/2001 | Kerxhalli et al. | |
| 6,310,681 B1 | 10/2001 | Taniwaki | |
| 6,321,060 B1 | 11/2001 | Nakayasu et al. | |
| 6,336,024 B1 | 1/2002 | Kanaya et al. | |
| 6,369,842 B1 | 4/2002 | Abramsohn | |
| 6,381,428 B1 | 4/2002 | Yamamoto et al. | |
| 6,404,517 B1 | 6/2002 | Chao | |
| 6,434,279 B1 | 8/2002 | Shiba | |
| 6,441,915 B1 | 8/2002 | Imaizumi et al. | |
| 6,441,923 B1 | 8/2002 | Balasubramanian et al. | |
| 6,449,060 B1 | 9/2002 | Kawai et al. | |
| 6,456,310 B1 | 9/2002 | Wallace et al. | |
| 6,456,311 B1 | 9/2002 | Harush et al. | |
| 6,459,823 B2 * | 10/2002 | Altunbasak et al. | 382/299 |
| 6,462,821 B1 | 10/2002 | Borton et al. | |
| 6,493,010 B1 | 12/2002 | Takahashi et al. | |
| 6,493,011 B1 | 12/2002 | Shioya | |
| 6,493,064 B2 | 12/2002 | Cabiri et al. | |
| 6,493,083 B2 | 12/2002 | Parisi et al. | |
| 6,526,240 B1 | 2/2003 | Thomas et al. | |
| 6,529,616 B1 * | 3/2003 | Rasmussen et al. | 382/112 |
| 6,556,313 B1 | 4/2003 | Chang et al. | |
| 6,643,035 B1 | 11/2003 | Salgado | |
| 6,644,773 B2 | 11/2003 | Bildstein et al. | |
| 6,731,889 B2 | 5/2004 | Nakayama | |
| 6,804,485 B2 | 10/2004 | Martin et al. | |
| 6,842,590 B2 | 1/2005 | Dalal et al. | |
| 6,856,336 B2 | 2/2005 | Toyoda | |
| 6,889,028 B1 | 5/2005 | Hunold et al. | |
| 6,909,516 B1 | 6/2005 | Hoover | |
| 6,911,993 B2 | 6/2005 | Nishikawa et al. | |
| 6,973,272 B2 | 12/2005 | Yamamoto et al. | |
| 7,002,701 B1 | 2/2006 | Nakayasu et al. | |
| 7,013,094 B2 | 3/2006 | Dalal et al. | |
| 7,013,803 B2 | 3/2006 | Hansen et al. | |
| 7,039,348 B2 | 5/2006 | Kerxhalli et al. | |
| 7,071,957 B2 | 7/2006 | Fujimoto | |
| 7,075,561 B2 | 7/2006 | Ozawa et al. | |
| 7,085,009 B2 | 8/2006 | Kawai et al. | |
| 7,100,508 B1 | 9/2006 | Mader | |
| 7,106,477 B2 | 9/2006 | Horobin | |
| 7,127,125 B2 | 10/2006 | Perlmutter et al. | |
| 7,239,833 B2 * | 7/2007 | Tomita et al. | 399/299 |
| 7,257,358 B2 * | 8/2007 | Overall et al. | 399/301 |
| 7,443,535 B2 | 10/2008 | Ishibashi | |
| 7,512,377 B2 | 3/2009 | Choi et al. | |
| 7,610,004 B2 | 10/2009 | Kato et al. | |
| 7,630,672 B2 * | 12/2009 | Baretsky et al. | 399/301 |
| 7,652,790 B2 | 1/2010 | Touura | |
| 7,658,462 B2 * | 2/2010 | Eom | 347/19 |
| 7,826,095 B2 | 11/2010 | Wang et al. | |
| 7,933,034 B2 * | 4/2011 | Takano | 358/1.15 |
| 2001/0017645 A1 | 8/2001 | Toda | |
| 2001/0021208 A1 | 9/2001 | Ueyanagi et al. | |
| 2001/0033395 A1 | 10/2001 | Chizawa | |
| 2001/0033686 A1 | 10/2001 | Klassen | |
| 2002/0063907 A1 * | 5/2002 | Harrington | 358/504 |
| 2002/0102114 A1 | 8/2002 | Kawanishi | |
| 2002/0113968 A1 | 8/2002 | Parisi et al. | |
| 2002/0118350 A1 | 8/2002 | Cabiri et al. | |
| 2002/0122124 A1 | 9/2002 | Suda | |
| 2002/0159802 A1 | 10/2002 | Katahira | |
| 2002/0178952 A1 | 12/2002 | Sainio et al. | |
| 2003/0002043 A1 | 1/2003 | Abdulhalim et al. | |
| 2003/0044193 A1 | 3/2003 | Thomas et al. | |
| 2003/0052959 A1 | 3/2003 | Fujimoto | |
| 2003/0053093 A1 | 3/2003 | Eom | |
| 2003/0063301 A1 | 4/2003 | Klassen | |
| 2003/0086103 A1 * | 5/2003 | Mestha et al. | 358/1.9 |
| 2003/0090689 A1 | 5/2003 | Klassen | |
| 2003/0098985 A1 | 5/2003 | Horobin et al. | |
| 2003/0145745 A1 | 8/2003 | Hansen et al. | |
| 2003/0145751 A1 | 8/2003 | Hansen et al. | |
| 2003/0174184 A1 | 9/2003 | Bildstein et al. | |
| 2003/0197877 A1 | 10/2003 | Lee | |
| 2003/0210412 A1 | 11/2003 | Ishibashi | |
| 2003/0214568 A1 | 11/2003 | Nishikawa et al. | |
| 2004/0046981 A1 | 3/2004 | Taka et al. | |
| 2004/0076450 A1 | 4/2004 | Martin et al. | |
| 2004/0114025 A1 | 6/2004 | Kerxhalli et al. | |
| 2004/0130737 A1 | 7/2004 | Kamimura et al. | |
| 2004/0175196 A1 | 9/2004 | Yamamoto et al. | |
| 2004/0191652 A1 * | 9/2004 | Dishon et al. | 430/30 |
| 2004/0227966 A1 * | 11/2004 | Lee | 358/1.9 |
| 2004/0239746 A1 | 12/2004 | Ozawa et al. | |
| 2005/0047834 A1 | 3/2005 | Tomita et al. | |
| 2005/0069220 A1 | 3/2005 | Czyszczewski et al. | |
| 2005/0093956 A1 | 5/2005 | Egan | |
| 2005/0111759 A1 | 5/2005 | Perlmutter et al. | |
| 2005/0134874 A1 | 6/2005 | Overall et al. | |
| 2005/0157297 A1 | 7/2005 | Abdulhalim et al. | |
| 2005/0157317 A1 * | 7/2005 | Butterfield et al. | 358/1.9 |
| 2005/0206934 A1 | 9/2005 | Nishikawa et al. | |
| 2005/0206980 A1 | 9/2005 | Nishikawa et al. | |
| 2005/0208685 A1 | 9/2005 | Abdulhalim et al. | |
| 2005/0214037 A1 | 9/2005 | Kishi | |
| 2005/0281459 A1 | 12/2005 | Bala et al. | |
| 2006/0001765 A1 | 1/2006 | Suda | |
| 2006/0005722 A1 | 1/2006 | Nobukawa et al. | |
| 2006/0013603 A1 | 1/2006 | Matsuyama | |
| 2006/0056882 A1 | 3/2006 | Kwon et al. | |
| 2006/0065625 A1 | 3/2006 | Abdulhalim et al. | |
| 2006/0114282 A1 | 6/2006 | Mizes et al. | |
| 2006/0114283 A1 | 6/2006 | Mizes et al. | |
| 2006/0115303 A1 | 6/2006 | Kang et al. | |
| 2006/0119690 A1 | 6/2006 | Park | |
| 2006/0120626 A1 | 6/2006 | Perlmutter et al. | |
| 2006/0120772 A1 | 6/2006 | Kitazawa et al. | |
| 2006/0132807 A1 | 6/2006 | Abdulhalim et al. | |
| 2006/0139433 A1 | 6/2006 | Yoshida | |
| 2006/0159337 A1 | 7/2006 | Pearson et al. | |
| 2006/0164506 A1 | 7/2006 | Kitao | |
| 2006/0171748 A1 | 8/2006 | Inui et al. | |
| 2006/0176354 A1 | 8/2006 | Yoshida | |
| 2006/0176355 A1 | 8/2006 | An | |
| 2006/0177246 A1 | 8/2006 | Kawada et al. | |
| 2006/0182472 A1 | 8/2006 | Munakata et al. | |
| 2006/0191437 A1 | 8/2006 | Mader | |

| | | |
|---|---|---|
| 2006/0244980 A1 | 11/2006 | Grace |
| 2006/0262326 A1 | 11/2006 | Abdulhalim et al. |
| 2006/0263120 A1 | 11/2006 | Hayakawa |
| 2006/0275057 A1 | 12/2006 | Suzuki |
| 2006/0290767 A1 | 12/2006 | Tezuka et al. |
| 2007/0002403 A1 | 1/2007 | Klassen |
| 2007/0003332 A1 | 1/2007 | Kim |
| 2007/0019056 A1 | 1/2007 | Jung et al. |
| 2007/0048031 A1 | 3/2007 | Kinoshita |
| 2007/0077059 A1 | 4/2007 | Denoue et al. |
| 2007/0095235 A1 | 5/2007 | Nielsen et al. |
| 2007/0115339 A1 | 5/2007 | Matsuzaki et al. |
| 2008/0030787 A1 | 2/2008 | McElvain |
| 2008/0030788 A1 | 2/2008 | McElvain et al. |
| 2008/0030789 A1 | 2/2008 | McElvain et al. |
| 2008/0294363 A1* | 11/2008 | Parmar et al. .................. 702/95 |

OTHER PUBLICATIONS

Oztan et al., "Quantitive Evaluation of Misregistration Induced Color Shifts in Color Halftones", Electronic Imaging, vol. 5667, p. 225 (2000).
Yang et al., "Light Scattering and Ink Penetration Effects on Tome Reproduction", Pics 2000: Image Processing, Sys, Conf., Portland, OR, p. 225 (2000).
Arney et al., "Kubelka-Munk Theory and the MTF of Paper", Journ. of Imaging Science and Tech., vol. 47, No. 4, p. 339 (2003).
Arney et al., "Kubelka-Munk Theory and the MTF of Paper", *Journal of Imaging Science and Tech.*, vol. 47, No. 4, pp. 339-345 (Jul./Aug. 2003).
Oztan et al., "Quantitative Evaluation of Misregistration Induced Color Shifts in Color Halftones", *Color Imaging X: Processing, Hardcopy, and Applications, Proc. of SPIE=IS&T Electronic Imaging, SPIE* vol. 5667, pp. 501-512 (2005).
Sharma, "Digital Color Halftones", *Digital Color Imaging Handbook*, Ch. 6, E. (Dec. 2002).
Yang et al., "Light Scattering and Ink Penetration Effects on Tone Reproduction", *Inst. of Science and Tech.*, Linkping Univ., Sweden, *PICS'2000* (Mar. 2000).
JP Patent Application No. 2007-198484 Office Action (Notice of Grounds for Rejection) dated May 24, 2011, pp. 1-2.
U.S. Appl. No. 11/804,806, Office Action Communication Dated Sep. 8, 2011, 30 pages.
Shen, et al., Spectral Characterization of a Color Scanner by Adaptive Estimation, J. Opt. Soc. Am. A, vol. 24, No. 7, Jul. 2004, pp. 1125-1130.
Shi, et al., Using Reflectance Models for Color Scanner Calibration, J. Opt. Soc. Am. A, vol. 19, No. 4, Apr. 2002, pp. 645-656.
U.S. Appl. No. 11/496,909, filed Aug. 1, 2006, Office Action Communication Dated Mar. 18, 2010, 24 pages.
U.S. Appl. No. 11/496,909, filed Aug. 1, 2006, Office Action Communication Dated Aug. 17, 2010, 15 pages.
U.S. Appl. No. 11/496,909, filed Aug. 1, 2006, Advisory Action Communication Dated Oct. 20, 2010, 3 pages.
U.S. Appl. No. 11/496,909, filed Aug. 1, 2006, Office Action Communication Dated Sep. 13, 2011, 13 pages.
U.S. Appl. No. 11/496,909, filed Aug. 1, 2006, Notice of Allowance Communication Dated Dec. 15, 2011, 9 pages.
U.S. Appl. No. 11/804,806, filed May 21, 2007, Office Action Communication Dated Jan. 8, 2010, 29 pages.
U.S. Appl. No. 11/804,806, filed May 21, 2007, Office Action Communication Dated Mar. 26, 2010, 23 pages.
U.S. Appl. No. 11/804,806, filed May 21, 2007, Office Action Communication Dated Jun. 24, 2010, 21 pages.
U.S. Appl. No. 11/804,806, filed May 21, 2007, Advisory Action Communication Dated Aug. 17, 2010, 3 pages.
U.S. Appl. No. 11/804,806, filed May 21, 2007, Office Action Communication Dated Sep. 7, 2010, 17 pages.
U.S. Appl. No. 11/804,806, filed May 21, 2007, Office Action Communication Dated Sep. 8, 2011, 17 pages.
U.S. Appl. No. 11/804,806, filed May 21, 2007, Notice of Allowance Communication Dated Dec. 21, 2012, 15 pages.
U.S. Appl. No. 11/804,806, filed May 21, 2007, Notice of Allowance Communication Dated Apr. 19, 2012, 10 pages.

* cited by examiner

FIG. 2
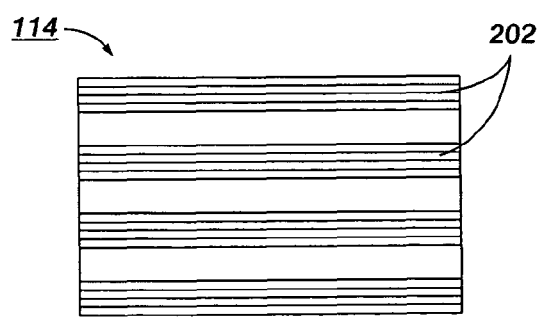
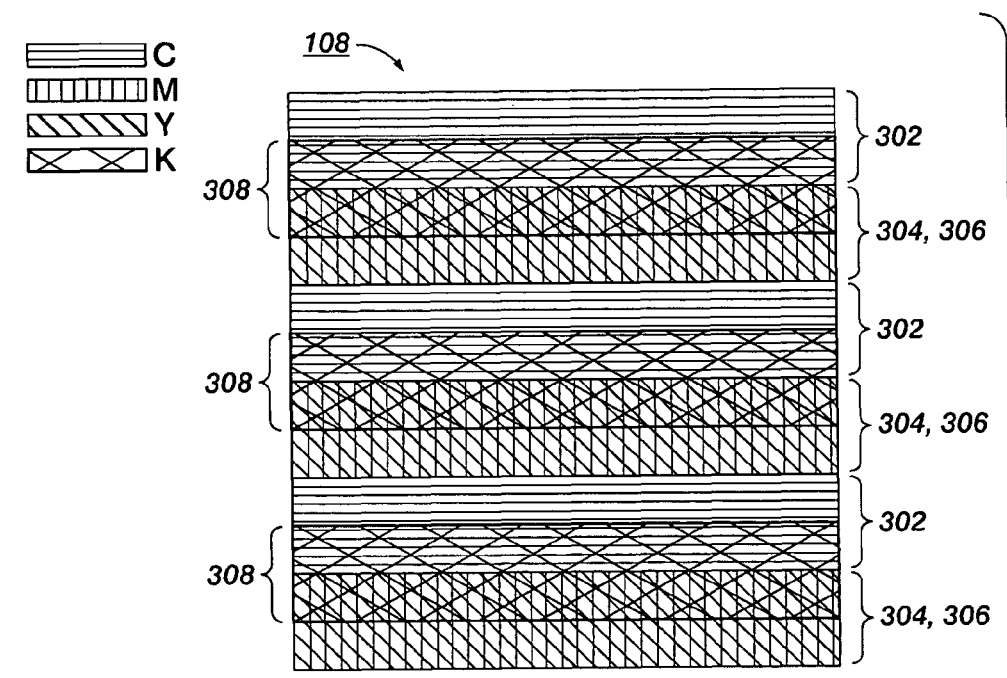
FIG. 3

SYSTEM AND METHOD FOR HIGH RESOLUTION CHARACTERIZATION OF SPATIAL VARIANCE OF COLOR SEPARATION MISREGISTRATION

CROSS-REFERENCE TO RELATED U.S. PATENT APPLICATIONS

The present disclosure is related to U.S. patent application Ser. No. 11/496,909, filed on Aug. 1, 2006 and U.S. Pat. No. 7,894,109, issued on Feb. 22, 2011, both of which are concurrently filed, assigned to the present assignee and hereby incorporated by reference.

BACKGROUND

The present disclosure relates generally to a system and method for color printing. In particular, the present disclosure relates to a system and method for high resolution characterization of spatial variance of color separation misregistration.

In multi-color printing systems a limited number of color separations are used for marking a substrate for achieving a wider variety of colors, with each separation marking the substrate using discrete shapes, such as dots having a circular or oval shape, or periodic line patterns. This concept is generally known as color halftoning, and involves combining two or more patterned separations on the substrate. The selection of color separations and halftone design are carefully chosen for achieving a visual effect of the desired color.

Many prior art printing systems use cyan, magenta, yellow and black (also referred to as CMYK) color separations that mark a substrate using discrete cluster dots. In accordance with one prior art method, the dots may be marked in a dot-on-dot fashion, by marking the substrate with a first and second color separation, with the dots of the second color separation superimposed over the dots of the first color separation for achieving the desired color. In accordance with a second prior art method, the dots are applied in a dot-off-dot fashion, with the dots of the second color separation placed in the voids of the dots the first color separation for achieving the desired color. Multi-color printing systems are susceptible to misregistration between color separations due to a variety of mechanical related issues. For both dot-on-dot and dot-off-dot rendering, color separation misregistration may cause a significant color shift in the actual printed color that is noticeable to the human eye.

Another marking method of rotated cluster dot sets is widely used since anomalies (e.g., color shifts) due to color separation misregistrations are subtle and less detectable by the human eye. However, even in these cases color misregistrations can be objectionable, particularly at edges of objects that contain more than one separation. Therefore, it is important to characterize color separation misregistration in order to perform corrective action in the print engine.

Many prior art methods for characterizing misregistration of color separations include using physical registration marks. The registration marks include two fine straight lines, each line formed using a different color separation. The two lines are aligned and joined to form one straight line. Alignment of the two lines is analyzed, with misalignment indicating misregistration of one of the color separations relative to the other. The analysis may include studying the printed registration marks with a microscope and visually determining if misregistration has occurred. Such analysis is tedious and not conducive to automation. The analysis may include imaging the marker with a high resolution scanning device and analyzing the high resolution scanned image using complex software for determining the positions of the registration marks relative to one another. This type of analysis can require expensive high resolution scanning equipment and may involve a significant amount of computational power. Furthermore, this type of processing is prone to error due to even small defects, such as toner splatter.

In another prior art method used for higher end printer devices outputting high volume and/or high quality images, misregistration of color separations is characterized by measuring the transition time between the edges of two primary separation patches (e.g., cyan and magenta) on a moving photoreceptor belt. The patches have angled edges (e.g., chevrons) that allow the determination of misregistration in both the fast scan direction (transverse to the longitudinal axis of the photoreceptor belt) and slow scan direction (parallel to the longitudinal axis of the photoreceptor belt). Simple photo detectors are used to measure the time between the moving edges of the chevrons, and this can in turn be used to compute the misregistration in both slow and fast scan directions. A drawback to this method is the inability to take misregistration measurements across the page, as the photo detectors are present in only two or three locations across the width of the photoreceptor belt. This method of separation misregistration characterization has been designated for use with high end printer systems due to the cost of the photo detectors and associated analysis software.

Furthermore, current methods for characterizing color misregistration test for misregistration between only two color separations at a time.

To overcome the drawbacks in the prior art, it is an aspect of the present disclosure to provide a system and method for characterizing misregistration of color separations using a method that is conducive to real time measurement using low resolution scanning technology.

It is another aspect of the present disclosure to provide a system and method for analyzing a test pattern using simple processing of few elements for minimizing the processing load.

It is another aspect of the present disclosure to print and analyze a test pattern, where the analysis is highly immune to page defects upon which the test pattern is printed.

It is a further aspect of the present disclosure to characterize color misregistration between more than two color separations at a time.

It is a further aspect of the present disclosure to characterize color misregistration using a testing pattern that occupies a minimal amount of space for maximizing resolution for testing spatial variance.

SUMMARY

The present disclosure is directed to a method for characterizing color separation misregistration of a printer device using color separations of a color space for marking substrate. The method includes providing an input image including a pattern of patches including at least one measurement patch, each measurement patch having at least a first and second color separation of the color space, and marking a substrate in accordance with the input image for generating an output image having a marked pattern of patches which corresponds to the pattern of patches. Spectral reflectance of at least one respective patch of the marked patch pattern of the output image is measured and respective spectral reflectance values corresponding to the measuring are generated. Misregistration is characterized between the at least first and second color separations of each measurement patch of the at least one measurement patch based on the spectral reflectance values.

The present invention is further directed to a processor assembly including at least one processor for receiving a spectral reflectance value corresponding to respective measurement patches of at least one measurement patch included in an output image output by a printer device, wherein the output image is a copy of an input image. The processor assembly includes a misregistration determination module including a series of programmable instructions executable by the at least one processor for characterizing misregistration of the first color separation relative to the second color separation based on the received spectral reflectance values.

The present invention is also directed to a calibration data structure storing a plurality of entries. Each entry includes a spectral reflectance value and corresponding misregistration data indicative of degree and direction of misregistration between at least two color separations.

Other features of the presently disclosed system and method for characterization of color separation misregistration will become apparent from the following detailed description, taken in conjunction with the accompanying drawings, which illustrate, by way of example, the presently disclosed system and method.

BRIEF DESCRIPTION OF THE DRAWINGS

Various embodiments of the present disclosure will be described below with reference to the figures, wherein:

FIG. 2 is a diagram of an exemplary single separation patch of calibration patches of an image input to the system shown in FIG. 1;

FIG. 3 is a diagram of an exemplary measurement patch of an image input to the system shown in FIG. 1, the measurement patch including four color separations and having no color separation misregistration;

DETAILED DESCRIPTION

Figure 1:
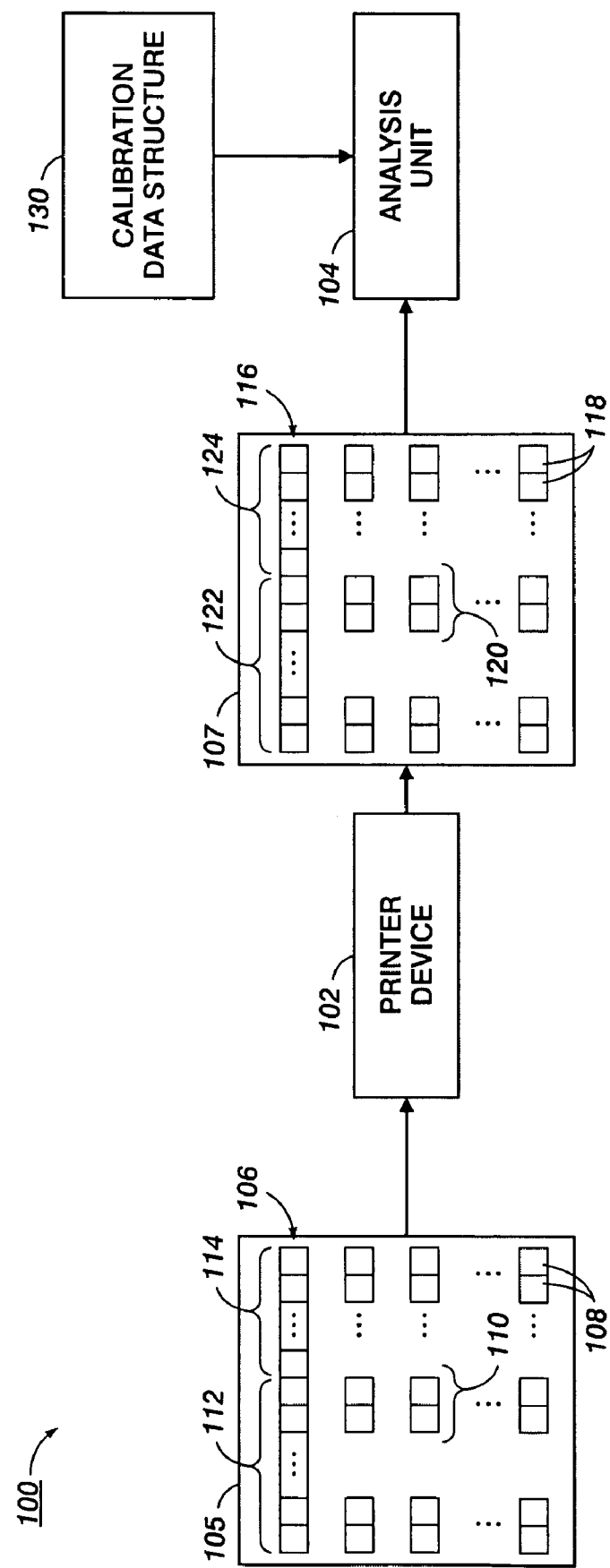
FIG. 1 is a block diagram of an exemplary color separation misregistration characterization system in accordance with the present disclosure.

Referring now to the drawing figures, in which like references numerals identify identical or corresponding elements, the color separation misregistration characterization (CSMC) system and method in accordance with the present disclosure will now be described in detail. With initial reference to FIG. 1, an exemplary CSMC system in accordance with the present disclosure is illustrated and is designated generally as CSMC system 100. CSMC system 100 includes a printer device 102 and an analysis unit 104. An input image 105 is input to the printer device 102 which marks a substrate with an image that corresponds to the input image 105.

The input image 105 includes a pattern of patches including a plurality of calibration patches 106 and a plurality of measurement patches 108, which may be arranged in pairs 110. The calibration patches 106 include a set of Neugebauer primary patches 112 and a set of single separation patches 114 described further below. Each of the measurement patches 108 has a predetermined color separation configuration including an image line screen having a plurality of parallel lines including respective lines of at least a first and second color separation, as described further below.

The marked substrate is output as an output image 107 having a plurality of marked calibration patches 116 that corresponds to the plurality of calibration patches 106, and a plurality of marked measurement patches 118 which may be arranged in pairs 120 that correspond to the plurality of measurement patches 108 and the pairs 110. The calibration patches 116 include a set of Neugebauer primary patches 122 which correspond to the Neugebauer patches 112 and a set of single separation patches 124 which correspond to the single separation patches 114. The output image 107 is submitted to the analysis unit 104 for analysis of spectral reflectance of the respective marked patches of the plurality of calibration patches 116 and the plurality of measurement patches 118.

Spectral reflectance is a function of wavelength, and is the reflected light intensity divided by the intensity of the incident light, and includes specular and diffuse reflectance. Specular reflectance refers to surface reflectance commonly associated with gloss, and is strongest in intensity when viewed from an angle equal to 180 degrees minus the angle of incident light. In printing applications in which a paper substrate is marked with toner the spectral reflectance is generally negligible. Diffuse reflectance is generally isotropic in nature, and involves light that is scattered from within the toner/ink and substrate layers, Reference throughout the disclosure to spectral reflectance, unless otherwise noted, may be understood to refer to diffuse spectral reflectance.

The term "printer device" as used herein encompasses any apparatus or system, such as a digital copier, xerographic printing system, ink jet printing system, reprographic printing system, bookmaking machine, facsimile machine, multifunction machine, textile marking machine, etc., which performs a marking output function for any purpose. The modality for marking may include, for example, applying toner, ink, dye, etc., to the substrate or embossing, peening, etching, etc. the substrate. The substrate may be a material such as paper, cardboard, a transparency, a paper derivative, metal, plastic, glass, wood, cloth, etc. The substrate may also be a photoreceptor belt, upon which toner is deposited during xerographic development. Real-time misregistration characterization may be performed by providing a spectrophotometer bar which measures spectral reflectance of the photoreceptor belt as it passes by.

The printer device 102 receives the input image 105 and outputs output image 107. The input image 105 may be received as a digital file in a printer ready language, often referred to as a page description language, such as PostScript™, PDF™, or PCL™. The digital file may be received by the printer device 102 via a job request from a remote or local device, such as a computer terminal or scanner (not shown), or by scanning in a document having a plurality of patches printed thereon. In the latter case, the scanning is performed by positioning the document on a scanner plate or platen glass of the printer device 102 and the document is scanned in by a scanner integrated with the printer device 102.

The printer device 102 marks a substrate in accordance with the input image 105 generating the output image 107. The patches are in the form of lineart and do not require further halftoning. When color separation registration of the printer device 102 is ideal (e.g., no color separation misregistration), the output image 107 is substantially identical to the input image 105, and the spectral reflectance of the patches of the output image 107 are substantially identical to the spectral reflectance of the patches of the input image 105.

The spectral reflectance of each respective marked calibration patch 116 of the plurality of marked calibration patches 116 is measured for establishing a calibration data structure 130, such as a look-up-table (LUT) or the equivalent, storing a plurality of measurement patch entries in which spectral reflectance values determined by an analytical or empirical process correspond to misregistration values indicative of the degree and direction (e.g., up or down, left or right) of misregistration of one or more color separations of the color separation configuration relative to another of the color separations. Spectral reflectance of the marked measurement patches 118 is measured. The measurement of each respective marked measurement patch 118 is used as an index for looking up a corresponding misregistration value in the calibration data structure 130 for determining the misregistration between color separations of the measured marked measurement patch 118. The relative misregistration is characterized for the slow and fast scan directions. Once the color separation misregistration is characterized, steps may be taken to correct the misregistration. Correction of the color separation misregistration is beyond the scope of the present disclosure.

The calibration patches 106 are shown in FIG. 1 as positioned at the top of a substrate upon which the input image 105 is provided, but positioning of the calibration patches 106 is not limited to a particular position. The set of Neugebauer primary patches 112 includes a solid patch for different grouping for each possible permutation of color separations of the color separation space being used, including no color separation of the color separation space. For an N-color separation space (using N different color separations), a Neugebauer primary patch is provided for each possible permutation using 0-N color separations of the N color separation space. In the present example, the color separation space is CMYK (cyan, magenta, yellow, black), and N is 4. The Neugebauer primary patches 112 include a patch with no color separation (referred to as W for white for a white substrate, although the substrate is not limited to being white), and a patch for each of the following combinations: W, C, Y, M, K, CY, CM, CK, YM, YK, MK, CYM, CYK, CMK, YMK, CYMK, totaling 16 Neugebauer primary patches 112.

The calibration patches 116 of the output image 107 include Neugebauer primary patches 122 and single separation patches 124. The respective Neugebauer primary patches 112 and 122 are marked on the corresponding substrate by applying a layer of each of the separation colors included in the combination used for the patch. During the fusing stage of the xerographic printing process, the toner for each of the layers is combined to produce a combination that has a unique spectral reflectance relative to the other Neugebauer primary patches 112 or 122, respectively. The spectral reflectance of each of the Neugebauer primary patches 122 of the output image 107 is measured. The spectral reflectance measurement of the W Neugebauer primary patch 122 is the spectral reflectance of the substrate of the output image 107. Application of spectral reflectance measurements associated with the Neugebauer primary patches 122 is described further below.

FIG. 2 shows a single separation patch 114 in greater detail. The single separation patches 114 includes a line screen having parallel lines 202 having a predetermined nominal fill factor, which is a nominal 50% fill factor in the present example, of a single color separation. The term "fill factor" refers to the total percentage of area of a patch covered by toner of the color separation of interest relative to the entire area. A nominal 50% fill factor is specified, since physical marking artifacts such as ink or toner spread may result in actual fill factors less or greater than 50%. A pair of single separation patches is provided for each single color separation, one for each orientation (typically 0 and 90 degrees). The single separation patch 114 shown in FIG. 2 is the first patch of the pair of patches provided for the color separation cyan. For the CMYK color space there are eight single separation patches 114.

The parallel lines of the line screens of the first and second single separation patches 114 of each pair have a first and second orientation, respectively, which are different from one another, where the difference between them is not an integer multiple of 180°. The line screen orientations are defined by the angle between the parallel lines of the line screen and a reference line, typically an edge of the paper.

Spectral reflectance measurements of the pair of single separation patches 114 is used for calibrating misregistration measurements in the slow and fast scan directions. In the following example, the line screen orientation of the first and second patch of each pair of single separation patches 114 is 0 and 90 degrees, respectively. Spectral reflectance measurements of the single separation patch 114 having the 0 degree line screen orientation is used for calibrating misregistration measurements in the slow direction, and spectral reflectance measurements of the single separation patch 114 having the 90 degree line screen orientation is used for calibrating misregistration measurements in the fast direction.

The first and second line screen orientations of the single separation patches 114 are not limited to 0° or 90° as demonstrated in the example above. For example, the respective line screen orientations may be 45° and 135°, and generation of the calibration data structure 130 and/or calculation of misregistration in the slow and fast directions may be determined by performing a rotation operation. Performance of rotation operations is described in concurrently filed U.S. Application, entitled "SYSTEM AND METHOD FOR CHARACTERIZING COLOR SEPARATION MISREGISTRATION", and assigned to the present assignee, which is hereby incorporated by reference in its entirety.

The fill factor of the input single separation patches 114 is not necessarily the same as the fill factor of the marked single separation patch 124, and may vary due to factors, such as properties of the toner, substrate and marking environment and equipment used. The fill factor of the marked single separation patches 124 is indicative of the fill factor of the line screens of the marked measurement patches 118. Since the fill factor will affect the spectral reflectance measurements of the marked single separation patches 124 and the marked measurement patches 118, determination of the fill factor of the marked single separation patches 124 is useful in determining the misregistration of the marked measurement patches 118.

FIG. 3 shows an exemplary measurement patch 108 of a pair of measurement patches 110 from input image 105. The measurement patch 108 includes overlapping parallel lines using each of the color separations in the color space used (CMYK in the present example) and having a first line screen orientation. The other measurement patch 108 of the pair includes the same configuration of overlapping parallel lines, however using a second line screen orientation that is different from the first line screen orientation, where the difference between these is not an integer multiple of 180°. Information obtained from spectral reflectance measurements of the pair of measurement patches is used for determining misregistration in the slow and fast scan directions. In the following example, the first and second line orientation of each pair of measurement patches 110 is 0 and 90 degrees, respectively. Spectral reflectance measurements of the measurement patches 108 having the 0 and 90 degree line screen orientation is used for determining misregistration in the slow and fast directions, respectively.

The first and second line screen orientations of the measurement patches 108 are not limited to 0° or 90° as demonstrated in the example above. For example, the respective line screen orientations may be 45° and 135°, and generation of the calibration function and/or calculation of misregistration in the slow and fast directions may be determined by performing a rotation operation. Performance of rotation operations is described in concurrently filed U.S. Application entitled "SYSTEM AND METHOD FOR CHARACTERIZING COLOR SEPARATION MISREGISTRATION", and assigned to the present assignee. The first and second line screen orientations of the measurement patch pairs 110 do not have to be the same as the first and second line screen orientations of the single separation patches 114.

Figure 4:
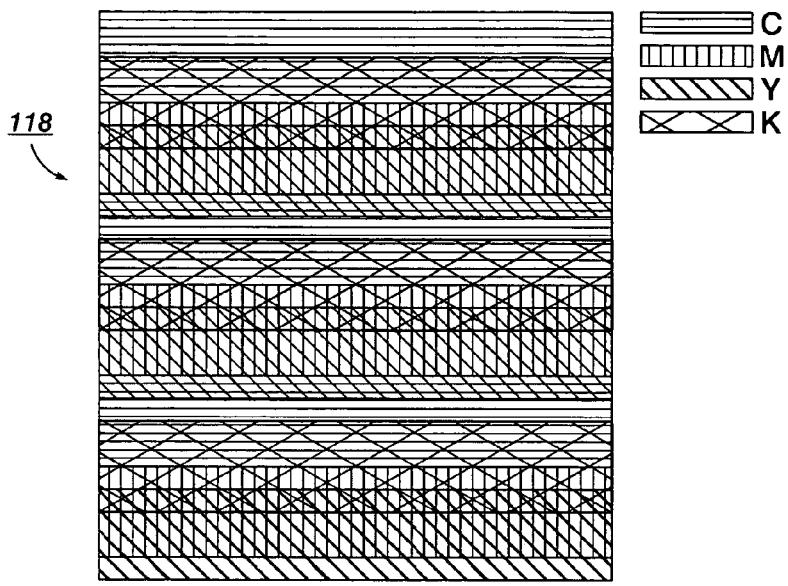
FIG. 4 is a diagram of an exemplary marked measurement patch of an image output from the system shown in FIG. 1, the measurement patch including four color separation and having color separation misregistration between two of the four color separations.

FIG. 4 shows a measurement patch 118 of output image 107 that corresponds to the exemplary measurement patch 108 shown in FIG. 3, in which one of the color separations is misregistered. In the example shown in FIG. 4, the yellow color separation is misregistered (e.g., markings using the yellow separation are shifted) in a downward direction. The measurement patch 118 shown in FIG. 4 has a spectral reflectance that differs from the spectral reflectance of the corresponding measurement patch 108 shown in FIG. 3. The difference in the spectral reflectance is visually noticeable and measurable.

The measurement patch 108 includes a line screen for respective colors of the color space used, each line screen formed of a 50% fill factor of the corresponding color. In the present example, four line screens 302, 304, 306 and 308 are provided, each formed of a 50% fill factor of C, Y, M and K, respectively. For clarity, the reference numbers indicate the fill factor portion of the respective line screens. Each of the line screens includes at least one halftone period including a 50% fill factor of one color separation formed as a straight line. The respective measurement patches may include several halftone periods, where the straight lines are formed as spaced parallel lines. At least a portion of the line screens 302, 304, 306 and 308 are displaced relative to one another so that they partially overlap one another. The displacement is referred to as phase shift. The degree of phase shifting between the line screens is predetermined. Phase shifting, the effect of phase shifting and the use of phase shifting for characterizing color separation misregistration is described in concurrently filed U.S. Patent Applications entitled "SYSTEM AND METHOD FOR CHARACTERIZING COLOR SEPARATION MISREGISTRATION" and "SYSTEM AND METHOD FOR CHARACTERIZING SPATIAL VARIANCE OF COLOR SEPARATION MISREGISTRATION".

The plurality of measurement patches 108 may be substantially identical. The spectral reflectance measurements of the marked calibration patches 116 are used to generate the calibration data structure 130. The spectral reflectance of each of the marked measurement patches 118 is measured, as described further below. Using the calibration data structure 130, the spectral reflectance measurements of the marked measurement patches 118 is correlated with the amount of misregistration for C,M,Y relative to K. A profile of the misregistration as a function of spatial location on the substrate of the color separations used in the marked measurement patches 118 relative to one another can be obtained with high granularity (e.g., about 0.25 inches). In the present example, the misregistration of each of C, M, and Y is determined relative to K.

Figure 5:
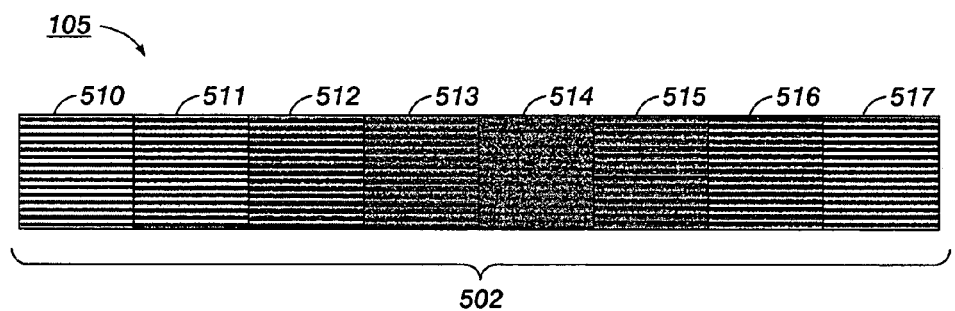
FIG. 5 is an exemplary halftone period of a series of patches showing the relationship between phase shift and color characteristics.

FIG. 5 is provided in order to illustrate the relationship between phase shifting and visually noticeable changes in appearance. FIG. 5 shows a series of patches 502, each patch using a first and second image line screen. Each line screen is formed of a 50% fill factor for a different color. The first and second line screens form a first set of lines 506 and a second set of lines 508, respectively, having at least one line each, wherein all of the lines are parallel. Lines 506 of the first set are formed of a first color separation, and (such as cyan, shown as the lighter shaded lines 506) and lines 508 of the second set are formed of a second color separation (such as magenta, shown as the darker shaded lines 508).

The series of patches 502 includes eight patches numbered 510-517. The first patch 510 uses a line-on-line rendering in which lines 506 of the first set are line-on-line with the lines 508 of the second set; and the fifth patch 514 uses a line-off-line rendering in which the lines 506 of the first set are line-off-line with the lines 508 of the second set. Line-on-line refers to lines of a first color separation superimposed over the lines of a second color separation for achieving a desired color, similar to dot-on-dot, and line-off-line refers to the lines of a first color separation placed in the voids of the lines of a second color separation for achieving a desired color, similar to dot-off-dot. In the present example there are no voids between the lines of the first and second color separation in the line-off-line rendering.

The lines 508 remain in a fixed position in all of the patches 510-517. For patches 511-517, the lines 506 are translated or displaced by an incremental amount relative to the previous patch in a horizontal direction. The displacement of lines 506 relative to lines 508 is also referred to as phase shift or screen displacement. As the lines 506 are translated incrementally relative to lines 508 in each subsequent patch of the series 502 referred to as incremental screen displacement, the line-on-line pattern of patch 510 transitions gradually to the line-off-line pattern of patch 514, and then gradually towards a line-on-line rendering again in patches 515-517, completing a full cycle or halftone period.

In the example shown, the translation increment is ¼ the width of the lines 506 and 508 (all having an equal width that is half the width of the line-screen period). The transition from patch 510 to 517 represents a full halftone period, with each of the eight patches 510-517 representing a ⅛ halftone period. The spectral reflectance and color characteristics, such as chroma and luminance, of the patches 511-517 change due to the different overlap of lines 206 relative to 208, which is visually apparent. Chroma and luminance are each a function of spectral reflectance. For example, the fifth patch 514 in which the lines are rendered line-off-line has the greatest chroma. The change in spectral reflectance, luminance and color characteristics (e.g., chroma) is measurable and predictable.

With continued reference to the exemplary measurement patch 108 shown in FIG. 4, the predetermined degree of phase shifting between the color separations is now described. Line screen 402, the C screen, is phase shifted (−L/4) relative to line screen 408, the K screen, and line screens 404 and 406, the M and Y screens, respectively, are in phase with one another (superimposed) and phase shifted (+L/4) relative to the K screen, where L is the halftone period. The degree of phase shifting between line screens is not limited to the phase shifts described, however, the phase shifting described for a four color color-space optimizes the range of misregistration that can be determined. Furthermore, the phase shift signs (+ or −) for each of the C,M,Y separations relative to K is not limited to those described above. For example, another phase shift configuration relative to K could be (−L/4,+L/4,−L/4) for the C,M,Y separations, respectively. The line screen frequency used for the line screens 402, 404, 406 and 409 may be selected in accordance with the desired result, where the higher the line screen frequency, the more precise color precision is produced, and the lower the frequency, the greater the range of misregistration predictability.

Figure 6:
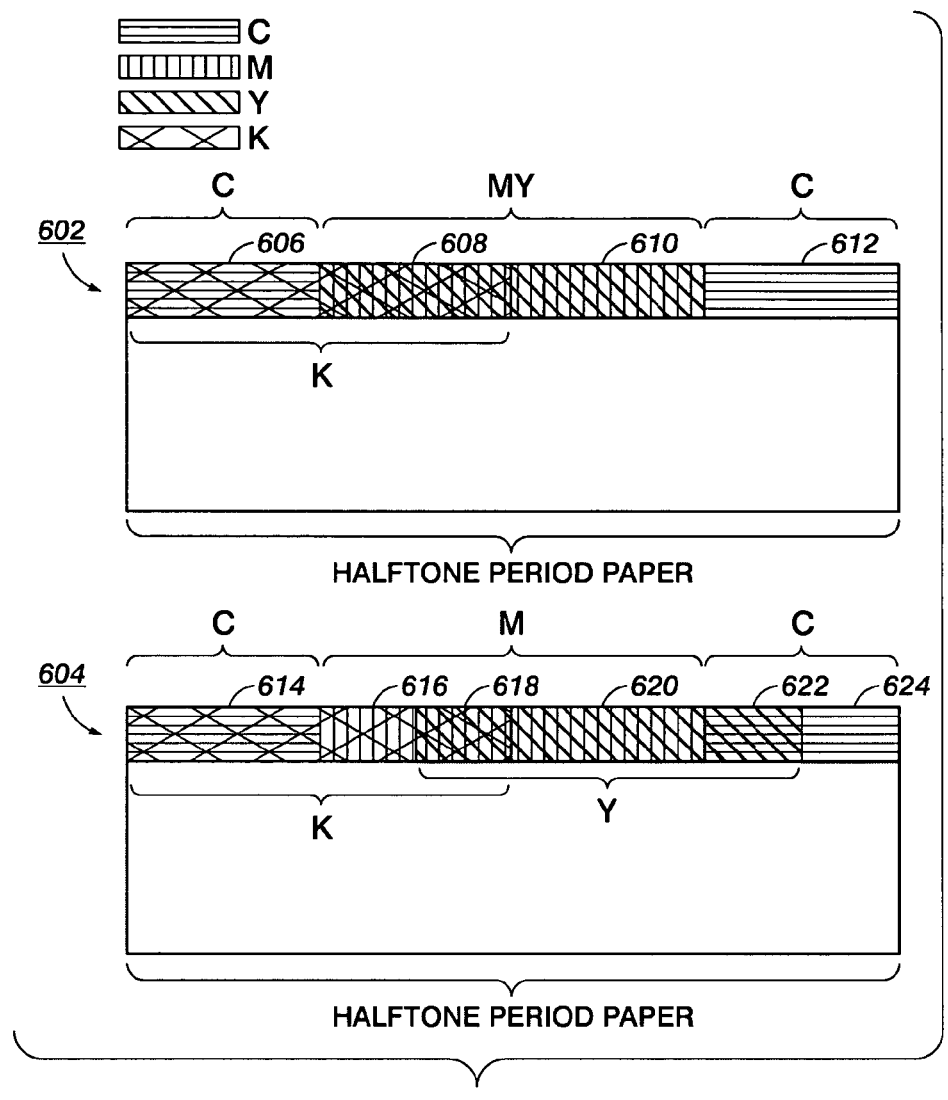
FIG. 6 shows an exemplary cross-section of the measurement patch shown in FIG. 3, and an exemplary cross-section of the marked measurement patch shown in FIG. 4.

FIG. 6 shows a first cross-sectional view 602 of a measurement patch 108 of the input image 105 with no misregistration, and a second cross-sectional view 604 of a marked measurement patch 118 in which misregistration exists. Each of the cross-sectional views 602 and 604 illustrates a full halftone period or cell broken into physically distinct regions m. The regions corresponding to cross-sectional view 602 include region 606 (CK), region 608 (MYK), region 610 (MY) and region 612 (C). The regions corresponding to cross-sectional view 604 include region 614 (CK), region 616 (MK), region 618 ((MYK), region 620 (MY), region 622 (CY) and region 624 (C).

With misregistration of measurement patch 118, the number of regions, the combination of color separations per region and/or the size of the regions are changed relative to the measurement patch 108 having no misregistration. The spectral reflectance of each region is related to the spectral reflectance of a corresponding Neugebauer patch 122. Accordingly, spectral reflectance measurements of the Neugebauer patches 122 are useful in determining the misregistration of a marked measurement patch 118. Furthermore the size of the regions corresponds to the fill factor per separation of the single separation patches 124. Determination of the fill factor per separation is also useful in determining the misregistration of the marked measurement patch 118.

Figure 7:
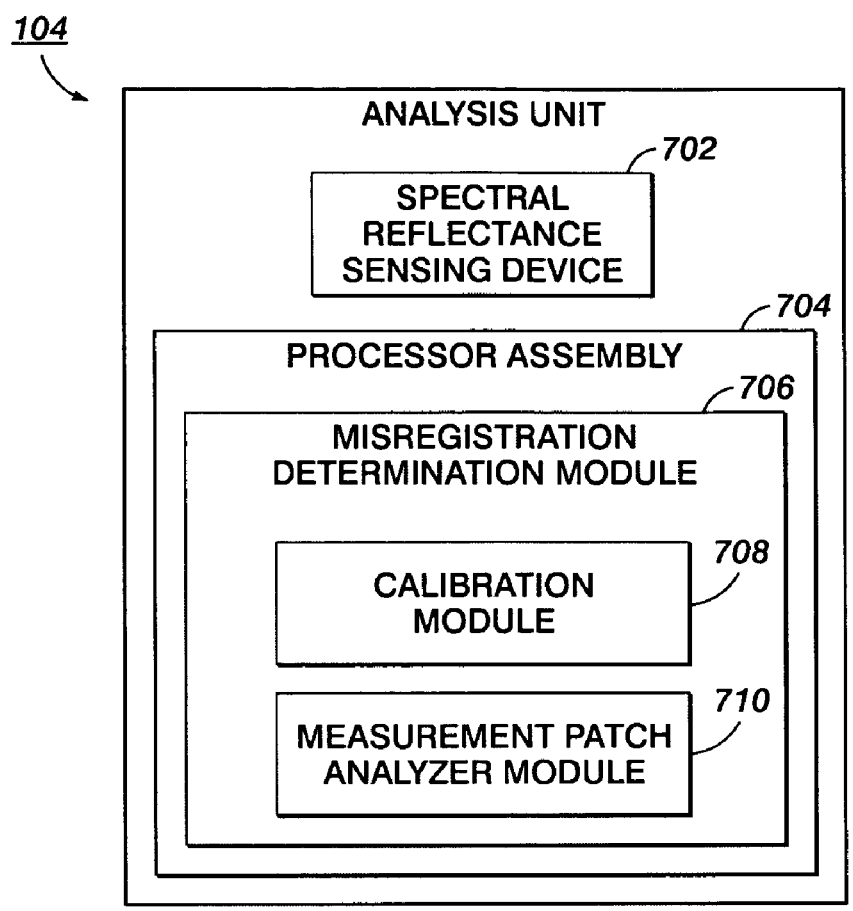
FIG. 7 shows a block diagram of an analysis unit of the system shown in FIG. 1.

Measurements of the spectral reflectance of the calibration patches 106 and measurement patches 108, analysis of the measurements for characterizing color separation misregistration in the measurement patches 108 and generation of the calibration data structure 130 are performed by the analysis unit 104. FIG. 7 shows an embodiment of the analysis unit 104, where the analysis unit 104 includes a spectral reflectance sensing device 702 that measures spectral reflectance of individual patches of the calibration patches 106 and measurement patches 108. The spectral reflectance sensing device 702 may include an illumination device having at least one light source, an aperture through which incident light (ambient light and/or light generated by the at least one light source) enters, and an array of photo detectors for sensing light having entered through the aperture and outputting a signal indicative of the spectral reflectance. The output signal may have a property (e.g., a magnitude) that is indicative of an average value of the output by the photo detectors of the array. One example of a spectral reflectance sensing device 702 is a spectrophotometer.

The spectral reflectance sensing device 702 may be a handheld device which a user physically holds and moves over the output image 107 for scanning the output image 107. Alternatively, the spectral reflectance sensing device 702 may be a non-portable device which receives the output image 107 and automatically scans the output image 107. The spectral reflectance sensing device 702 outputs an analog or digital signal. If the signal is analog, it is converted to a digital signal. The analog-to-digital conversion may be performed by analog-to-digital converter (ADC) circuitry integrated with the spectral reflectance sensing device 702 or external from the spectral reflectance sensing device 702. The output spectral reflectance values may include an average spectral reflectance value for each measurement patch 108.

The measured spectral reflectance values output by the spectral reflectance sensing device 702 are provided to a processor assembly 704 having at least one processor. A misregistration determination module 706 executable on the at least one processor receives the measured spectral reflectance values. The misregistration determination module 706 includes a calibration module 708 and a measurement patch analyzer module 710. The calibration module 708 generates the calibration data structure 130. The calibration data structure 130 is stored on a storage device that is accessible to the processor assembly 704. The measurement patch analyzer module 710 uses spectral reflectance measurements of a marked measurement patch 118 to look up a corresponding misregistration in the calibration data structure 130 for determining misregistration of the marked measurement patch 118.

Each software module, including the misregistration determination module 706 and its calibration module 708 and analyzer module 710, includes a series of programmable instructions capable of being executed by the processor assembly 704. The series of programmable instructions can be stored on a computer-readable medium, such as RAM, a hard drive, CD, smart card, 3.5" diskette, etc., or transmitted via propagated signals for being executed by the processor assembly 704 for performing the functions disclosed herein and to achieve a technical effect in accordance with the disclosure. The functions of the respective software modules may be combined into one module or distributed among a different combination of modules.

The analysis of the measurements associated with the marked calibration patches 116 and marked measurement patches 118 by the analysis unit 104 will now be explained. First, generation of the calibration data structure 130 by the calibration module 408 is explained. In the absence of paper scattering, a simple Neugebauer reflectance model for this configuration could be used, which would appear as follows:

$$R(\lambda) = \sum_i f_i R_i(\lambda) \qquad (1)$$

where $R_i$ is the reflectance spectrum of the $i^{th}$ Neugebauer primary, and $f_i$ is the corresponding fill factor, in other words the percentage of the total halftone period the ith Neugebauer primary occupies. However, it is well known that paper scattering can significantly distort the actual reflectance spectrum, since photons entering one region "m" of a patch may emerge from an entirely different region "n" of the patch. The standard approach to accounting for the Yule-Nielsen effect is to add an empirical correction parameter $\gamma$ to Equation 1, effectively coupling the various Neugebauer primaries:

$$R(\lambda) = \left\{ \sum_i \alpha_i [R_i(\lambda)]^{\frac{1}{\gamma}} \right\}^\gamma \quad (2)$$

However, by applying this correction, the coefficients $\alpha_i$ no longer carry any physical significance relative to the actual fill factors, and typically serve as additional fit parameters in standard printer modeling. Accordingly, a different approach is used for determining misregistration, as described below.

Since paper scattering can significantly distort an actual reflectance spectrum, paper scattering is modeled from a probabilistic standpoint for constructing a spectral reflectance model. Modeling paper scattering using a probabilistic standpoint is described in "Light Scattering and Ink Penetration Effects on Tone Reproduction", L. Yang, B. Kruse, R. Lenz, PICS 2000: Image Processing, Image Quality, Image Capture, Systems Conference, Portland, Oreg., March 2000, p. 225. Using the probabilistic modeling, the local paper reflectance is described in terms of a point spread function PSF(x-x'), indicating the probability that a photon will enter the paper at region x and exit at region x'. For simplicity, the following exponential PSF is assumed (actually a line spread function):

$$PSF(x - x') = \frac{\alpha}{2} R_p(\lambda) \exp[-\alpha |x - x'|] \quad (3)$$

where $R_p(\lambda)$ is the spectral reflectance of the paper, and $\alpha$ is related to the paper scattering coefficient. Additionally, other point spread functions can be used that provide an adequate description of the scattering properties of the substrate.

The flux of incident photons that enter a region m of a particular halftone period from any halftone period and exit the same region m of the particular halftone period and summed for all of the halftone periods of a theoretical measurement patch for which an entry is to be provided in the calibration data structure 130 may be determined by integrating the PSF, such as in accordance with Equation (4):

$$I_{mm}(\lambda) = I_o(\lambda) T_m^2(\lambda) \sum_{p=-\infty}^{\infty} \int_{r_m}^{r_m+w_m} dx \int_{r_m+pL}^{r_m+w_m+pL} PSF(x-x') dx' \quad (4)$$

where $I_o(\lambda)$ is the incident light flux, $T_m(\lambda)$ is the transmission of region m, L is the halftone period, and $r_m$ and $w_m$ correspond to the starting position and width of region m ($r_o$=0), respectively.

Likewise the flux of photons that enter any region m and exit through a region other than region m of the same halftone period, referred to as region n, and summed for all of the halftone periods of the measurement patch 108 being analyzed is computed as follows:

$$I_{mn}(\lambda) = \quad (5)$$

$$I_o(\lambda) T_m(\lambda) T_n(\lambda) \sum_{p=0}^{\infty} \int_{r_m}^{r_m+w_m} dx \left\{ \int_{r_n+pL}^{r_n+w_n+pL} PSF(x-x') dx' + \int_{-(L-r_n)-pL}^{-[L-(r_n+w_n)]-pL} PSF(x-x') dx' \right\}$$

The average spectral reflectance across the halftone period is computed by summing Equations (4) and (5) for all regions m and n of a halftone period, and dividing by the incident intensity, resulting in the expression:

$$R(\lambda) = R_p(\lambda) \sum_{mn} \beta_{mn} T_m(\lambda) T_n(\lambda) \quad (6)$$

The coefficients $\beta_{mn}$ are purely geometric, and describe the coupling between region m and region n. A line spread function of Equation (3) results in the following closed form expressions for the symmetric matrix $\beta_{mn}$:

$$\beta_{mn} = \begin{cases} f_m - \frac{1}{\alpha L} \frac{(e^{\alpha L} - e^{\alpha w_m})(1 - e^{-\alpha w_m})}{e^{\alpha L} - 1} & m = n \\ \frac{1}{2\alpha L} \frac{e^{\alpha[L-(r_n-r_m)]}(e^{\alpha w_m}-1)(1-e^{-\alpha w_n}) + e^{\alpha(r_n-r_m)}(e^{\alpha w_n}-1)(1-e^{-\alpha w_m})}{e^{\alpha L} - 1} & m < n \end{cases} \quad (7)$$

where $f_m$ is the fill factor for region m. Because $\Sigma f_m = 1$, the matrix is $\underline{\beta}$ necessarily normalized, i.e., $\Sigma \beta_{mn} = 1$. A purely diagonal $\underline{\beta}$ would imply a vanishing Yule-Nielsen effect.

Equation (6) provides a foundation from which the patch spectral reflectance can be predicted, and therefore the misregistration characterized. However, the indices m refer to the various regions m in FIG. 6, but not directly to the Neugebauer primaries. There may be more than one region m associated with a particular Neugebauer primary, and such differences are accounted for by recasting Equation (6) in terms of the Neugebauer primaries, defining a new coupling matrix $\underline{\beta}'$ to be used in place of matrix $\underline{\beta}$ in Equation (6):

$$R(\lambda) = R_p(\lambda) \sum_{ij} \beta'_{ij} T_i(\lambda) T_j(\lambda) \quad (8)$$

where:

$$\beta'_{ij} = \sum \beta_{mn} \text{ for each } \{T_m = T_i, T_n = T_j\} \quad (9)$$

The Neugebauer coupling matrix $\beta'$ is also normalized, and for the case of no paper scattering, Equation (8) reduces to Equation (1), with $\beta_{ii} = f_i$.

Starting with the measurement patch configuration shown in FIG. 3, the predicted spectral reflectance may be computed as a function of CMY misregistrations in the range [−L/4,L/4] relative to K, using Equations (7), (8) and (9), where L is a halftone period. However, prior to doing so, it is necessary to determine the transmission spectra for the marked Neugebauer primary patches 122, which is $T_i(\lambda)$, the scattering probability coefficient $\alpha$ and the width of the printed lines in the measurement patch 108 being analyzed for each color separation.

The transmission spectra for the Neugebauer primaries $T_i(\lambda)$ are determined by assuming that the scattering is small relative to absorption in the toner layer. Spectral reflectance measurements of the 16 Neugebauer primary patches 122 can be expressed as follows:

$$R_i(\lambda) = T_i^2(\lambda) R_p(\lambda) \qquad (10)$$

or $$T_i(\lambda) = \sqrt{R_i(\lambda)/R_p(\lambda)} \qquad (11)$$

Accordingly, using Equation (11) and the spectral reflectance measurements of the Neugebauer primary patches 122, $T_i(\lambda)$ may be determined. In Equations (10) and (11), it has been assumed that the specular reflectance (e.g., surface reflectance most commonly associated with gloss) is negligible. Paper fluorescence and multiple reflections within the toner layer have also been ignored.

Determination of the scattering probability coefficient $\alpha$ and the width of the printed lines (for each separation) includes using the spectral reflectance measurements of the marked single separation patches 124. The absorption spectra of a toner for a color separation may be sufficiently different from that of paper, which is generally true for C, M, and Y. The reflectance spectrum for the single separation patches 124 can be modeled using Equation (8), with only two Neugebauer primaries present (e.g. cyan and paper white, as shown in FIG. 2). The simplified spectral reflectance for a fill factor f becomes:

$$R(\lambda) = \qquad (12)$$
$$R_p(\lambda)[T^2(\lambda)(f - Q(f, \alpha)) + (1 - f - Q(f, \alpha)) + 2T(\lambda)Q(f, \alpha)]$$

or $$1 - R(\lambda)/R_p(\lambda) = (1 - T^2(\lambda))f + (1 - T(\lambda))^2 Q(f, \alpha) \qquad (13)$$

where $$Q(f, \alpha) = \frac{1}{\alpha L} \frac{(e^{\alpha L} - e^{\alpha L f})(1 - e^{-\alpha L f})}{e^{\alpha L} - 1} \qquad (14)$$

Figure 8:
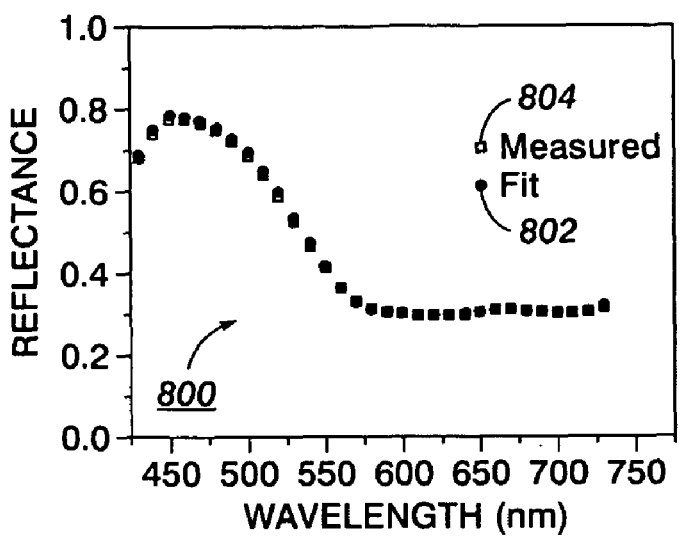
FIG. 8 shows a first plot of a curve for a least squares fit compared to a curve for measured spectral reflectance of a single separation patch.

When the spectral reflectance of a particular marked single separation patch 124 is measured, the quantities f and Q are determined via a least squares fit using Equation (13), since the paper reflectance $R_p(\lambda)$ and transmission $T(\lambda)$ for the color separation are known from the previous measurements of the Neugebauer primary patches 122. Once Q and f are determined, Equation (14) can be used to solve for a using fixed point iteration or similar methods. FIG. 8 shows a plot 800 of a curve 802 for the least squares fit compared to a curve 804 for the measured spectral reflectance for the single separation patch 124 for the cyan color separation rendered with the 0 degree line screen orientation. Using actual measurements, f=0.55 and Q=0.1622, resulting in $\alpha = 1/(63.64 \ \mu m)$, where the paper scattering coefficient is consistent with measurements found in "Kubelka-Munk Theory and the MTF of Paper", J. S. Arney, J. Chauvin, J. Nauman, P. G. Anderson, Journal of Imaging Science and Technology, Vol. 47, No. 4, July 2003, p. 339.

Q and f are determined for each of the C, M and Y separations using the spectral reflectance measurements of the marked single separation patches 124 for C, M and Y, for both the 0 and 90-degree line screen orientations each (six measurements in all). Since the absorption spectrum for K generally has little structure relative paper, the width of the black color separation may be taken as the average of the C, M, Y widths obtained from the least squares fit. The single separation patches 114 for the black color separation may be omitted from the input image 105 Although, in the general case where the black colorant does show spectral structure relative the substrate, one would perform the same procedure for that separation as well. Since $\alpha$ is assumed to be a fundamental property of the paper, $\alpha$ is determined to be the mean of the values obtained from the least squares fitting operations for determining a for both orientations of the C, M and Y single separation patch spectral reflectance measurements.

The calibration module 408 uses the spectral reflectance measurements of the marked Neugebauer primary patches 122 and the marked single separation patches 124 to generate the calibration data structure 130, including using the reflectance model described in the above equations. Specifically, the matrix $\beta'$ is determined and substituted for $\beta$ in equation (6). Equations (10)-(14) are used to determine the quantities $T_i(\lambda)$, $\alpha$ and f for each area m of a measurement patch entry to be included in the calibration data structure 130. The determined quantities $T_i(\lambda)$, a and f are then used in Equation (6).

The calibration data structure 130 is generated to include theoretical spectra for measurement patch entries having a quantized set of C,M,Y misregistration configurations relative to K (e.g., for the patch of FIG. 4), such that the misregistrations lie in a predetermined range e.g., [−L/4,L/4] in the present example. For each respective misregistration configuration (C,M,Y relative to K) a slow and fast scan direction measurement patch entry is provided, each associated with a spectral reflectance measurement and associated misregistration data for the associated scan direction. The misregistration data includes misregistration values indicative of the degree and direction of misregistration in the associated scan direction between color separations of the color space used. In the present example, the misregistration data includes a misregistration value corresponding to misregistration between all but one of the color separations of the color space used relative to the one color separation, and more specifically, misregistration values for each of C, M and Y relative to K.

The predetermined range is determined in accordance with the configuration of the measurement patch 108 shown in FIG. 3, such that within the range aliasing does not present a problem. The present disclosure is not limited to generation of the calibration data structure 130 using the above equations. It is also possible to generate the calibration data structure 130 using empirical data.

Variables that may affect the predetermined range include the number of colorants used and the amount of phase shifting between line screens used in the measurement patches 108. The quantized set of misregistrations may be selected in a straightforward fashion using the knowledge of the line widths of the individual color separations measured from the marked single separation patches 124. In a developed prototype using a 75 lines per inch (lpi) screen and 32 misregistration steps for each separation (~5 μm resolution), a lookup table was generated with 32768 entries.

Once the spectral reflectance measurements of the respective marked calibration patches 116 have been processed and the calibration data structure 130 generated, the reflectance spectrum measurements of the respective pairs 120 of marked measurement patches are used by the measurement patch analyzer module 710 to look up the measurement patch entries for the fast and slow scan directions for each pair 120 having the best fit to the spectral reflectance measurements. The misregistration values corresponding to the identified measurement patch entries for the fast and slow scan directions are retrieved. More specifically, for each pair 120 the spectral reflectance measurements corresponding to a first and second marked measurement patch 118 of the pair 120 is used as an index to look-up the corresponding misregistration values. The misregistration values corresponding to first and second marked measurement patch 118 are for the slow and fast scan directions, respectively. In the present example, the first marked measurement patch 118 has a 0 degree line screen orientation and the second marked measurement patch 118 has a 90 degree line screen orientation.

Each marked measurement patch 118 may have a unique spectral reflectance dependent on its misregistration characteristics. Measurements corresponding to each of the marked measurement patches are used to look up the respective measurement patch entries in the calibration data structure 130 having the smallest root mean square (RMS) error in theoretical spectral reflectance relative to the measured spectral reflectance.

Figure 9:
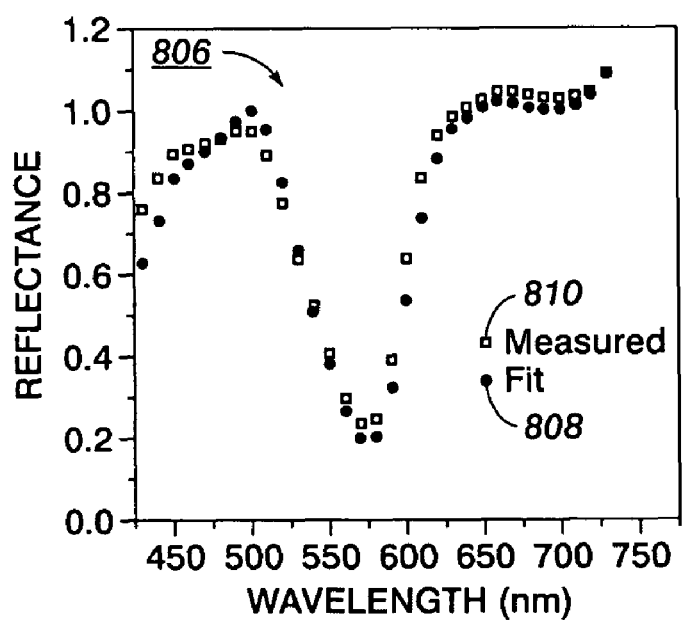
FIG. 9 shows a second plot of a curve showing a spectral fit for slow scan misregistration corresponding to a measurement patch entry with the worst RMS error relative to a curve showing actual measured reflectance spectra.
Figure 10:
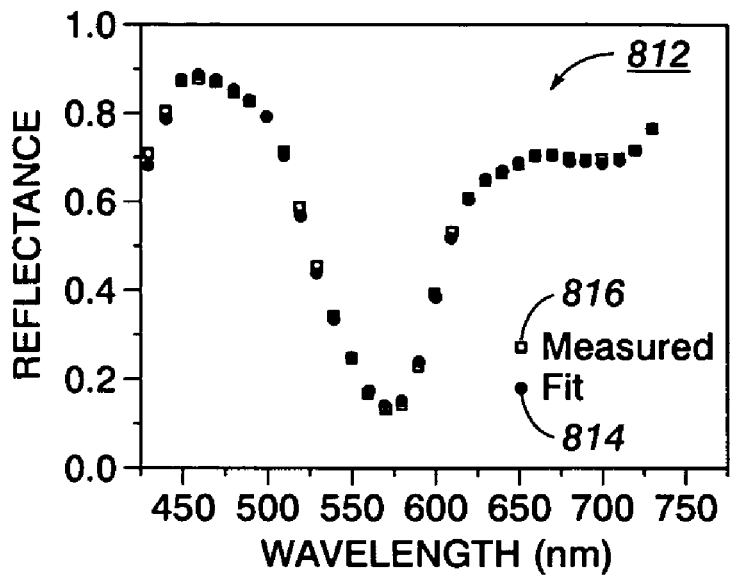
FIG. 10 shows a third plot of a curve showing the spectral fit for slow scan misregistration corresponding to a measurement patch entry with the best RMS error relative to a curve showing actual measured reflectance spectra.

Once the measurement patch entry is identified, misregistrations of C, M, Y relative to K associated with the identified measurement patch entry are retrieved. FIG. 9 shows a plot 806 including a curve 808 showing the spectral fit for slow scan misregistration corresponding to a measurement patch entry with the worst RMS error relative to a curve 810 showing actual measured reflectance spectra. FIG. 10 shows a third plot 812 including a curve 814 showing the spectral fit for slow scan misregistration corresponding to a measurement patch entry with the best RMS error relative to a curve 816 showing actual measured reflectance spectra. The measurements for the marked measurement patches shown in plot 806 and 812 were taken from spectral reflectance measurements of 560 measurement patches 118 marked on a substrate upon which the output image 107 was marked. Even the measurement patch entry with the worst RMS provides a fairly good fit to the measured reflectance spectrum data, suggesting that the reflectance model described by Equations (3)-(14) is adequate When looking up a measured spectral reflectance in the calibration data structure 130, if an entry having the exact measured spectral reflectance value does not exist other methods may be used for determining the most accurate misregistration values. The determination is based on the misregistration values associated with the entry or entries having the closest spectral reflectance value, such as by using interpolation in accordance with an appropriate function (e.g., linear or sinusoidal). Likewise, determining the misregistration values from the measured patch spectral reflectance can be obtained by using an analytic function or numerical methods, instead of the lookup table discussed above.

In one study, an input image 105 was provided with calibration marks 106 and measurement marks 108 and a plurality of physical measurement marks placed proximate the measurement patches. An output image 107 was generated, and misregistration at the locations of the marked measurement patches 118 was determined using the method of the present disclosure, using spectral reflectance measurements of the calibration marks 116 and the measurement marks 118. Furthermore, misregistration was determined at the locations of the proximate physical registration marks using a prior art method. Misregistration determinations obtained by measuring the spectral reflectance of the marked measurement patches 118 using the method of the present disclosure to determine misregistration in the slow and fast directions matched very closely with misregistration determinations obtained from physical registration marks provided on the marked substrate using the prior art method, with results shown in FIG. 11.

Figure 11:
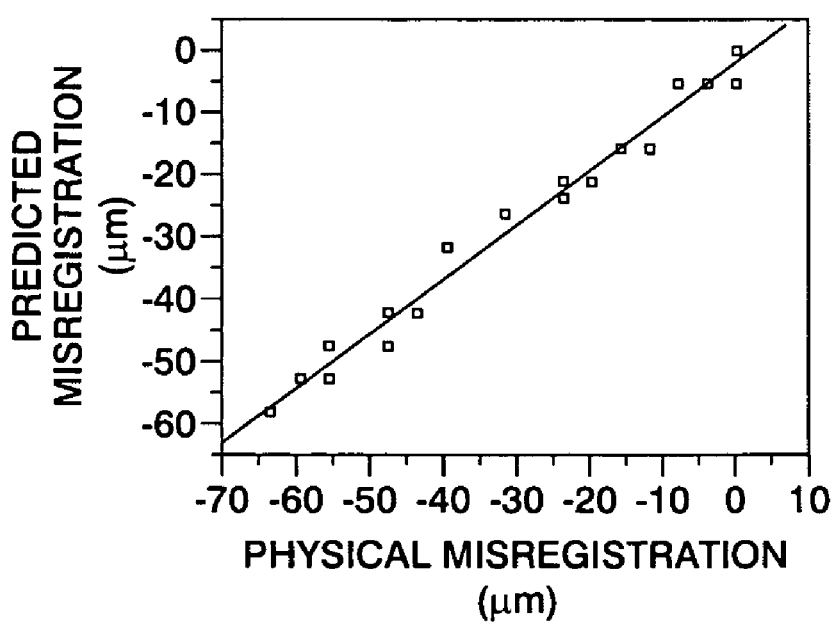
FIG. 11 shows a fourth plot showing the correlation between misregistration measurements using prior art methods and the method described in this disclosure.

FIG. 11 shows a plot 820 of experimental data, where plot 820 shows the correlation between misregistration measurements obtained using the method of the present disclosure and using a prior art method. The vertical axis corresponds to estimates of misregistration values obtained using spectral reflectance measurements in accordance with the present disclosure. The horizontal axis corresponds to misregistration values obtained using physical registration marks located proximate the measurement patches 118 in accordance with a prior art method.

Misregistrations may be determined for C,M,Y relative to K in the fast and slow directions as a function of position on the page (e.g., in terms of distance form top edge and left edge of the marked substrate). Corresponding plots may be provided which show the spatial variations in misregistration across the substrate.

Figure 12:
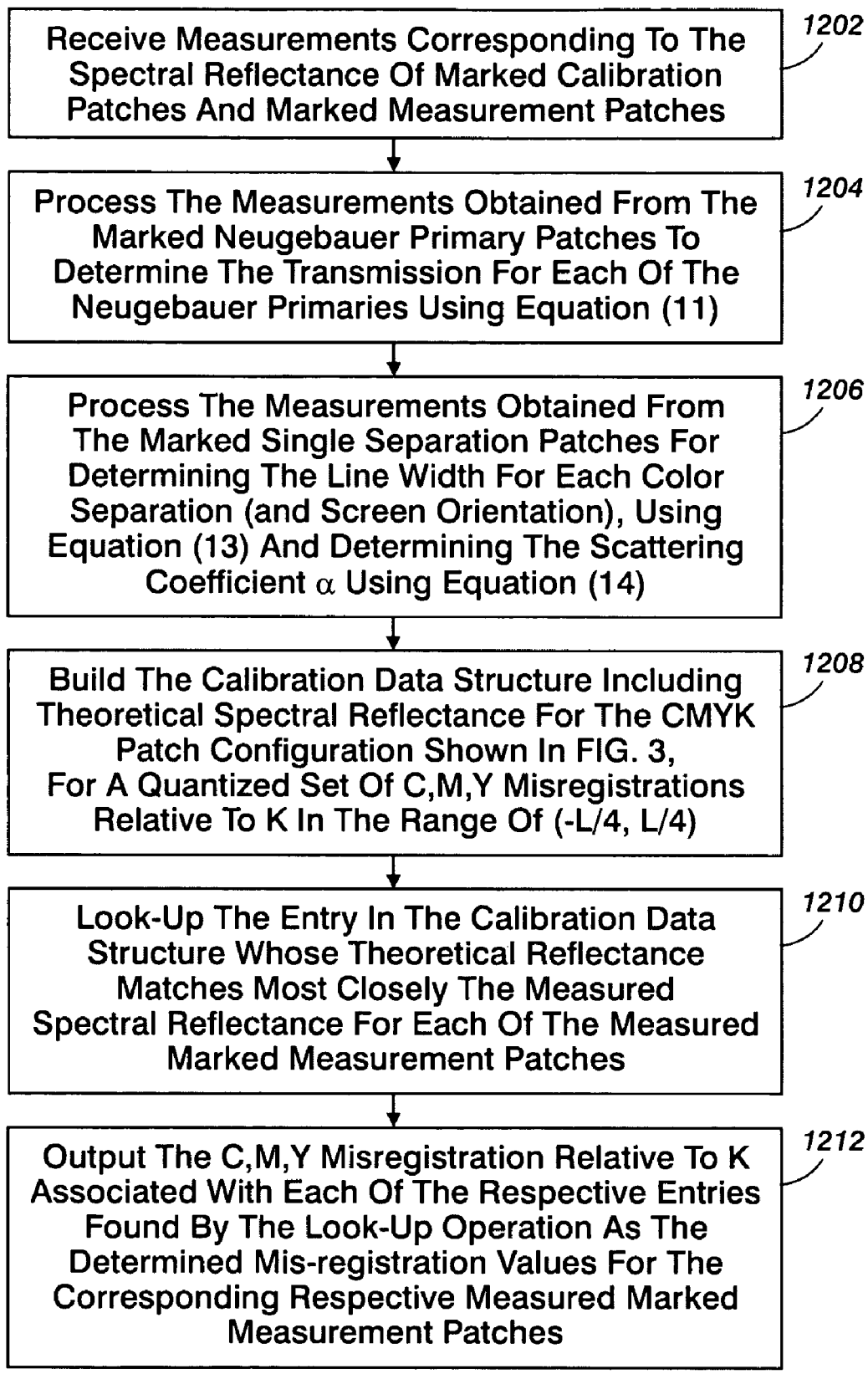
FIG. 12 is flowchart of steps performed by a processor assembly of the analysis unit shown in FIG. 7.

FIG. 12 shows steps performed by the processor assembly 704 in accordance with the present disclosure for determining misregistration of at least one color of a color space used relative to a another color of the color space. In the following example, the color space used is CMYK, and the misregistration of C, M and Y is determined relative to K. A calibration data table is generated, after which the misregistration of C, M and Y relative to K at the location of a marked patch 118 (per orientation) is determined by taking only one spectral reflectance measurement of the marked patch 118.

At step 1202, measurements corresponding to the spectral reflectance of marked calibration patches 16 and marked measurement patches 18 are received by the processor assembly 704 from the spectral reflectance sensing device. The marked calibration patches include marked Neugebauer primaries patches 122 and single separation patches 124. The marked Neugebauer primary patches 122 correspond to each of the Neugebauer primaries associated with the color space used ($2^n$ for an n-color color space, 16 in the present example). The single separation patches 124 include a pair of single separation patches for respective color separations of the color space, with the pair including single separation patches having a first and second line screen orientation, respectively, where the first and second line screen orientations are used for calibrating for misregistration determination in the fast and slow directions. If the first and second line screen orientations are other than 0 and 90 degrees, respectively, rotation operations may need to be performed mathematically for calibrating for misregistration determination in the slow and fast directions. In the present example, the single separation patches 124 include a pair of patches having 0 and 90 degree screen orientations, respectively, for each of the C, M and Y color separations (six patches in total).

At step 1204, the calibration module 708 processes the measurements obtained from the marked Neugebauer primary patches 122 to determine the transmission for each of the Neugebauer primaries using Equation (11). At step 1206, the calibration module 708 processes the measurements obtained from the marked single separation patches 124 for determining the line width for each color separation (and screen orientation), using Equation (13) and determining the scattering coefficient α using Equation (14).

At step 1208, the calibration module 708 builds the calibration data structure 130 including theoretical spectral reflectance for the CMYK patch configuration shown in FIG. 3, for a quantized set of C,M,Y misregistrations relative to K in the range of [−L/4, L/4]. At step 1210, the measurement patch analyzer module 710 looks up the entry in the calibration data structure 130 whose theoretical reflectance matches most closely the measured spectral reflectance for each of the measured marked measurement patches 118. More specifically, for each pair 120 including a first and second measurement patch 118, an entry is identified that corresponds to each of the respective first and second measurement patches.

At step 1212, the measurement patch analyzer module 710 outputs the C,M,Y misregistration relative to K associated with each of the respective entries found by the look-up operation as the determined misregistration values for the corresponding respective measured marked measurement patches 118. More specifically, the misregistration data is retrieved that is associated with the calibration data structure entries identified for the first and second marked measurement patches 118 of each pair 120. The misregistration data associated with the respective entries that corresponds to the first and second marked measurement patch 118 indicates misregistration of the C, M, Y separations relative to K in the slow and fast direction, respectively.

In the present example, the first and second marked measurement patches 118 have 0 degree and 90 degree line screen orientations, respectively. As described above, if the respective screen orientations for the single separation patches 114, 124 and the measurement patches 108, 118 are different than 0 degrees and 90 degrees, respectively, then rotation operations may need to be applied.

The pairs of measurement patches 10 may be distributed at different locations of the input image 105. Since two measurement patches are needed per pair 110, the pairs 110 may be closely spaced to one another for achieving a high spatial resolution. Accordingly, misregistration of the output image 107 may be characterized with a high degree of spatial resolution.

In accordance with the present disclosure the procedure the misregistration is characterized by taking spectral reflectance measurements of the calibration patches 116 and measurement patches 118. Spectral reflectance measurements are relatively simple to obtain and use in computations. Furthermore, low resolution measurements may be taken for generating the calibration data structure 130 and determining the color separation misregistration of a measurement patch 118, allowing for the use of lower resolution and less expensive sensing equipment and simpler processing than is used for prior art color separation misregistration detection methods. Furthermore, only one spectral reflectance measurement value need be obtained for each measurement patch, where the measurement patch may include three or more color separations. One look-up operation is performed for that measurement value in order to determine misregistration between more than two color separations, and in the example provided three or more color separations relative to one color separation.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for characterizing color separation misregistration of a printer device using a color space having N color separations for marking a substrate, comprising:
   providing an input image including a pattern of patches including at least one measurement patch, each measurement patch including at least a first and second line screen each having a set of at least two lines, wherein the set of at least two lines corresponding to the respective at least said first and second line screens are each formed of different color separations of the N color separations, respectively, wherein the first line screen is shifted relative to the second line screen using only one phase shift so that the at least two lines of the first line screen partially overlap the at least two lines of the second line screen forming at least one overlapping portion;
   marking said substrate in accordance with the input image for generating an output image having a marked pattern of patches which corresponds to the pattern of patches;
   measuring spectral reflectance of at least one respective patch of the marked patch pattern of the output image, wherein the measuring includes measuring the spectral reflectance of the at least one overlapping portion marked on the substrate;
   generating respective spectral reflectance values corresponding to the measuring;
   characterizing misregistration between the color separations associated with each of the at least first and second line screens of a marked measurement patch that corresponds to a measurement patch of the at least one measurement patch based on the spectral reflectance value that corresponds to the marked measurement patch, wherein the pattern of patches further includes a plurality of calibration patches; and
   using spectral reflectance values corresponding to a marked plurality of calibration patches of the marked patch pattern that corresponds to the plurality of calibration patches for the characterizing the misregistration, and
   wherein the plurality of calibration patches includes a plurality of Neugebauer patches, including a Neugebauer patch formed of a different grouping for each possible permutation of the N color separations of the color space, including the substrate itself, the method further comprising:
   using spectral reflectance values corresponding to a marked plurality of Neugebauer patches of the marked patch pattern that corresponds to the plurality of Neugebauer patches for the characterizing the misregistration.

2. The method according to claim 1, wherein the pattern of patches further includes a plurality of calibration patches, the method further comprising:
   using spectral reflectance values corresponding to a marked plurality of calibration patches of the marked patch pattern that corresponds to the plurality of calibration patches for the characterizing the misregistration.

3. The method according to claim 1, the method further comprising generating a calibration data structure storing a plurality of entries, each entry having a spectral reflectance value and corresponding misregistration data indicative of degree and direction of misregistration between at least two color separations;
   wherein the characterizing the misregistration comprises:
   identifying the calibration data structure entry having a spectral reflectance value that optimally matches the measured reflectance; and
   using the corresponding misregistration data to characterize the misregistration.

4. The method according to claim 1, wherein the method further comprises:
   using the measured spectral reflectance values corresponding to the marked plurality of Neugebauer patches for determining transmission spectra for the marked plurality of Neugebauer primary patches; and
   using the transmission spectra for the marked plurality of Neugebauer primary patches for characterizing the misregistration.

5. The method according to claim 1, wherein the at least two lines of the at least first and second line screens are parallel.

6. The method according to claim 5, wherein the plurality of calibration patches comprises a plurality of single separation patches, each respective single separation patch including a single different line screen for each of the at least first and second line screens, the method further comprising:
using spectral reflectance values corresponding to a marked plurality of single separation patches of the marked patch pattern that corresponds to the plurality of single separation patches for the characterizing the misregistration.

7. The method according to claim 6, wherein the method further comprises:
using the measured spectral reflectance values corresponding to the marked plurality of single separation patches for determining at least one of a scattering probability coefficient a, and a width of the parallel lines of each respective marked single separation patch; and
using the determined at least one of the scattering probability coefficient and line width information of the respective marked single separation patches for the characterizing the misregistration.

8. The method according to claim 1, wherein each measurement patch of the at least one measurement patch includes all of the N color separations included in the color space; and misregistration for each of the color separations relative to another color separation included in the color space is determined, and N is greater than 2.

9. The method according to claim 1, wherein each measurement patch of the at least one measurement patch has at least a first, second and third color separation, and misregistration between at least the first and third color separations and between the second and third color separations is determined based on one spectral reflectance measurement of the measurement patch.

10. A method for characterizing color separation misregistration of a printer device using a color space having N color separations for marking a substrate, comprising:
providing an input image including a pattern of patches including at least one measurement patch, each measurement patch including at least a first and second line screen each having a set of at least two lines, wherein the set of at least two lines corresponding to the respective at least said first and second line screens are each formed of different color separations of the N color separations, respectively, wherein the first line screen is shifted relative to the second line screen using only one phase shift so that the at least two lines of the first line screen partially overlap the at least two lines of the second line screen forming at least one overlapping portion;
marking said substrate in accordance with the input image for generating an output image having a marked pattern of patches which corresponds to the pattern of patches;
measuring spectral reflectance of at least one respective patch of the marked patch pattern of the output image, wherein the measuring includes measuring the spectral reflectance of the at least one overlapping portion marked on the substrate;
generating respective spectral reflectance values corresponding to the measuring; and
characterizing misregistration between the color separations associated with each of the at least first and second line screens of a marked measurement patch that corresponds to a measurement patch of the at least one measurement patch based on the spectral reflectance value that corresponds to the marked measurement patch, generating a calibration data structure storing a plurality of entries, each entry having a spectral reflectance value and corresponding misregistration data indicative of degree and direction of misregistration between at least two color separations;
wherein the characterizing the misregistration comprises:
identifying the calibration data structure entry having a spectral reflectance value that optimally matches the measured reflectance; and
using the corresponding misregistration data to characterize the misregistration, and
wherein generating the calibration data structure includes applying a line spread function.

11. A processor assembly including at least one tangible processor for receiving a spectral reflectance value corresponding to spectral reflectance measurements of respective patches of a pattern of patches included in an output image output by a printer device using N color separations of a color space for marking a substrate, the pattern of patches including a measurement patch including at least a first, second and third line screen each having a set of at least two lines, the sets of lines formed of a first, second and third color separation of the N color separations, respectively;
the processor assembly including a misregistration determination module including a series of programmable instructions executable by the at least one processor for characterizing misregistration between the first, second, and third color separations of the measurement patch based on a single spectral reflectance value associated with the measurement patch,
wherein the pattern of patches includes a plurality of Neugebauer patches, including a Neugebauer patch formed of a different grouping for each possible permutation of the N color separations of the color space, including no color separation; and
wherein the misregistration determination module:
uses measured spectral reflectance values corresponding to the marked plurality of Neugebauer patches for determining transmission spectra for the marked plurality of Neugebauer primary patches; and
uses the transmission spectra for the marked plurality of Neugebauer primary patches for characterizing the misregistration.

12. The processor assembly according to claim 11, wherein the misregistration determination module further generates a calibration data structure storing a plurality of entries, each entry having a spectral reflectance value and corresponding misregistration data indicative of degree and direction of misregistration between at least two color separations; and
wherein the characterizing the misregistration comprises:
identifying the calibration data structure entry having a spectral reflectance value that optimally matches the measured reflectance; and
using the corresponding misregistration data to characterize the misregistration.

13. The processor assembly according to claim 11, wherein the at least two lines of the at least first, second, and third line screens of the measurement patch are parallel lines, and wherein a line formed of the first color separation simultaneously partially overlaps a line formed of the second color separation and a line formed of the third color separation, forming at least one overlapping portion, and wherein the spectral reflectance value is associated with the at least one overlapping portion marked on the substrate.

14. The processor assembly according to claim 11, wherein misregistration between at least the first and third color separations and between the second and third color separations is determined based on one spectral reflectance measurement of the measurement patch.

15. A processor assembly including at least one tangible processor for receiving a spectral reflectance value corresponding to spectral reflectance measurements of respective patches of a pattern of patches included in an output image output by a printer device using N color separations of a color space for marking a substrate, the pattern of patches including a measurement patch including at least a first, second and third line screen each having a set of at least two lines, the sets of lines formed of a first, second and third color separation of the N color separations, respectively;

the processor assembly including a misregistration determination module including a series of programmable instructions executable by the at least one processor for characterizing misregistration between the first, second, and third color separations of the measurement patch based on a single spectral reflectance value associated with the measurement patch, wherein the at least two lines of the at least first, second, and third line screens of the measurement patch are parallel lines, and wherein a line formed of the first color separation simultaneously partially overlaps a line formed of the second color separation and a line formed of the third color separation, forming at least one overlapping portion, and wherein the spectral reflectance value is associated with the at least one overlapping portion marked on the substrate, wherein the pattern of patches further includes a plurality of single separation patches, each respective single separation patch including a single different line screen of the at least first, second, and third line screens; and wherein the misregistration determination:

uses measured spectral reflectance values corresponding to the marked plurality of single separation patches for determining at least one of a scattering probability coefficient a , and a width of the at least two parallel lines of each respective marked single separation patch; and uses the determined at least one of the scattering probability coefficient and line width information of the respective marked single separation patches for characterizing the misregistration.

16. A processor assembly having a memory device storing a calibration data structure storing a plurality of entries, each entry having a single spectral reflectance value and corresponding misregistration data indicative of degree and direction of misregistration between N color separations of a color space, wherein N is greater than 2;

wherein each entry corresponds to a measurement patch formed of at least a first, second, and third line screen each having a set of at least two lines, wherein the set of lines corresponding to the respective at least first, second, and third line screens are each formed of different color separations of the N color separations, respectively, wherein the first, second, and third line screens are shifted relative to each other using only one phase shift so that the at least two lines of the first line screen partially overlap the at least two lines of at least one of the second and third line screens forming at least one overlapping portion, and the spectral reflectance value corresponding to each entry is related to spectral reflectance of the entry's at least one overlapping portion, wherein the misregistration data includes fast scan direction data and slow scan direction data each indicative of degree and direction of misregistration in the respective scan direction; and wherein the data structure is generated based on spectral reflectance measurements of a plurality of calibration patches comprising:

a plurality of Neugebauer patches, including a Neugebauer patch formed of a different grouping for each possible permutation of the N color separations, including no color separation; and a plurality of single separation patches, each formed of a different color separation of the N color separations and including a single line screen having parallel lines formed of the corresponding color separation.

17. The processor assembly according to claim 16, wherein the single spectral reflectance value associated with each entry represents an actual measurement of spectral reflectance of a marked measurement patch having N color separations, and the corresponding misregistration data describes misregistration of the N color separations included in the marked measurement patch.

* * * * *